US009345249B2

(12) United States Patent
Groer et al.

(10) Patent No.: US 9,345,249 B2
(45) Date of Patent: May 24, 2016

(54) METHOD OF SUPPLEMENTING CYTOKINE, CHEMOKINE AND GROWTH FACTORS IN DONOR HUMAN MILK

(71) Applicants: Maureen Edith Groer, Tampa, FL (US); Terri Ashmeade, Tampa, FL (US)

(72) Inventors: Maureen Edith Groer, Tampa, FL (US); Terri Ashmeade, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/739,769

(22) Filed: Jun. 15, 2015

(65) Prior Publication Data

US 2015/0359240 A1    Dec. 17, 2015

Related U.S. Application Data

(60) Provisional application No. 62/011,968, filed on Jun. 13, 2014.

(51) Int. Cl.
*A23C 9/20* (2006.01)
*A23L 1/29* (2006.01)
*A23L 1/305* (2006.01)

(52) U.S. Cl.
CPC ............... *A23C 9/206* (2013.01); *A23L 1/296* (2013.01); *A23L 1/305* (2013.01); *A23V 2002/00* (2013.01)

(58) Field of Classification Search
CPC ......... A23C 9/206; A23L 1/296; A23L 1/305
See application file for complete search history.

(56) References Cited

U.S. PATENT DOCUMENTS

2015/0191714 A1*  7/2015  Ek ............................ C12N 9/96

OTHER PUBLICATIONS

Bauer J, Gerss J. Longitudinal analysis of macronutrients and minerals in human milk produced by mothers of preterm infants. Clin Nutr. 2011;30(2):215-220.
Braga & Palhares, Effect of evaporation and pasteurization in the biochemical and immunological composition of human milk. J Pediatr (Rio J). Jan.-Feb. 2007;83(1):59-63.
Castellote, et al., Premature delivery influences the immunological composition of colostrum and transitional and mature human milk. J Nutr. 2011;141(6):1181-1187.
Chatterton, et al. Anti-inflammatory mechanisms of bioactive milk proteins in the intestine of newborns. Int J Biochem Cell Biol. 2013;45(8)1730-1747.
Christen, et al., Ultrasonication and the quality of human milk: variation of power and time of exposure. J Dairy Res. Aug. 2012;79(3):361-6.
Czank, et al., Retention of the immunological proteins of pasteurized human milk in relation to pasteurizer design and practice. Pediatr Res. Oct. 2009;66(4):374-9.
Espinosa-Martos, et al., Bacteriological, biochemical, and immunological modification in human colostrum after Holder pasteurization. J Pediatr Gastroenterol Nutr. May 2013;56(5):560-8.
Ewaschuk, et al., Effect of pasteurization on immune components of milk: implications for feeding preterm infants. Appl Physiol Nutr Metab. Apr. 2011;36(2):175-82.
Ewaschuk, et al. Effect of pasteurization on selected immune components of donated human breast milk. J Perinatol. Sep. 2011;31(9):593-8.
Goelz, et al., Effects of different CMV-heat-inactivation-methods on growth factors in human breast milk. Pediatr Res. Apr. 2009;65(4):458-61.
Groer, et al.,. Multiplexing of human preterm and term cytokines. FASEB J. Apr. 2013; 27(Meeting Abstract Supplement):629.7.
Groer, et al., Cytokines, Chemokines, and Growth Factors in Banked Human Donor Milk for Preterm Infants. J Hum Lact. Mar. 24, 2014;30(3):317-323.
Hawkes, et al. Cytokines (IL-1beta, IL-6, TNF-alpha, TGF-beta1, and TGF-beta2) and prostaglandin E2 in human milk during the first three months postpartum. Pediatr Res. 1999;46(2):194-199.
Jang, et al., Serial changes of fatty acids in preterm breast milk of Korean women. J Hum Lact. 2011;27(3):279-285.
Kverka et al. Cytokine profiling in human colostrum and milk by protein array. Clin Chem. 2007;53(5):955-962.
McPherson & Wagner, The effect of pasteurization on transforming growth factor alpha and transforming growth factor beta 2 concentrations in human milk. Adv Exp Med Biol. 2001;501:559-66.
Reeves, et al. TGF-β2, a protective intestinal cytokine, is abundant in maternal human milk and human-derived fortifiers but not in donor human milk. Breastfeed Med. Dec. 2013;8(6):496-502.
Untalan, et al., Heat susceptibility of interleukin-10 and other cytokines in donor human milk. Breastfeed Med. Sep. 2009;4(3):137-44.
Ustundag, et al. Levels of cytokines (IL-1β, IL-2, IL-6, IL-8, TNF-α) and trace elements (Zn, Cu) in breast milk from mothers of preterm and term infants. Mediators Inflamm. 2005;2005(6):331-336.
Yilmaz, et al., Interleukin-10 and -12 in human milk at 3 stages of lactation: a longitudinal study. Adv Ther. May-Jun. 2007;24(3):603-10.
Zanardo, et al., Beta endorphin concentrations in human milk. J Pediatr Gastroenterol Nutr. 2001;33(2):160-164.

\* cited by examiner

*Primary Examiner* — Anthony Weier
(74) *Attorney, Agent, or Firm* — Robert J. Varkonyi; Smith & Hopen, P.A.

(57) ABSTRACT

Donor milk has become a standard of care for feeding preterm infants, particularly those with gestational ages of 34 weeks or less, whose mothers are not lactating or not producing sufficient milk quantities. However, prior to distribution, donor milk is required to undergo pasteurization, typically using the Holder method, which is believed to destroy immune proteins in the milk and denature many other proteins. Donor milk has been found to contain concentrations of chemokines, cytokines, and growth factors, evidencing the value of donor milk over formula. In light of the findings, donor milk is supplemented with chemokines, cytokines, and growth factors that are found to be lower in the donor milk as compared to mother's own milk.

20 Claims, 3 Drawing Sheets

METHOD OF SUPPLEMENTING CYTOKINE, CHEMOKINE AND GROWTH FACTORS IN DONOR HUMAN MILK

CROSS REFERENCE TO RELATED APPLICATIONS

This application claims priority to U.S. Provisional Application No. 62/011,968, entitled "Cytokine, Chemokine and Growth Factors in Donor Human Milk", filed Jun. 13, 2014, which is incorporated herein by reference.

STATEMENT OF GOVERNMENT SUPPORT

This invention was made with government support under Grant No. R21 NR013094 awarded by the National Institutes of Health. The government has certain rights in the invention.

FIELD OF INVENTION

This invention relates to milk supplementation. More specifically, the present invention provides for immunologic and growth-factor supplementation of donated breast milk.

BACKGROUND OF THE INVENTION

Human milk is the preferred form of infant nutrition for the first six months of life as recommended by the American Academy of Pediatrics and the World Health Organization. It contains various antibodies and immune cells, along with compounds that prevent pathogenic bacteria or toxins from binding to receptors, such as lysozyme, lactoferrin, and other oligosaccharides (Yilmaz, et al., Interleukin-10 and -12 in human milk at 3 stages of lactation: a longitudinal study. Adv Ther. 2007 May-June; 24(3):603-10). In addition to immune factors, there are hormones and other growth factors, such as epidermal growth factor (EGF), cytokines, such as transforming growth factor (TGF), and chemokines, including various interleukin proteins (IL-6, IL-8, IL-10, IL-13) and tumor necrosis factor proteins (TNFα and TNF-R) (Castellote, et al., Premature delivery influences the immunological composition of colostrum and transitional and mature human milk. J Nutr. 2011 June; 141(6):1181-7). For the first few days after birth, colostrum is expressed from the mammary glands. During this period the tight junctions of the mammary glands are open allowing for transport of components of the maternal blood, resulting in a composition having markedly different biochemical characteristics from mature milk (Espinosa-Martos, et al., Bacteriological, biochemical, and immunological modification in human colostrum after Holder pasteurization. J Pediatr Gastroenterol Nutr. 2013 May; 56(5): 560-8). During lactation, the composition changes as the milk transitions from colostrum to mature milk (Castellote, et al., Premature delivery influences the immunological composition of colostrum and transitional and mature human milk. J Nutr. 2011 June; 141(6):1181-7).

There are an estimated 15 million preterm infants born each year, which account for approximately 12% of the births (World Health Organization, Fact Sheet No. 363, last updated November 2014). The colostrum of preterm mothers expresses high levels of immunologic proteins, growth factors, and cytokines which decreases throughout lactation (Castellote, et al., Premature delivery influences the immunological composition of colostrum and transitional and mature human milk. J Nutr. 2011 June; 141(6):1181-7; FIGS. 1 & 2). Due to the unique composition of preterm milk, mothers of preterm infants are encouraged to express colostrum, and to establish lactation and pump as much as possible in the ensuing weeks. The American Academy of Pediatrics Recommendations of Breastfeeding Management for Preterm Infants state that all preterm infants should receive human milk and if mother's own milk (MOM) is unavailable, pasteurized donor human milk, appropriately fortified, should be used (The American Academy of Pediatrics. Breastfeeding and the use of human milk. Pediatrics. 2012; 129(3):e827-e841).

However, not all mothers choose to breast feed, or are able to breast feed, and the most vulnerable infants who require human milk are preterm infants. Moreover, maintaining lactation while separated from a very sick and small newborn must be through pumping in most cases as these infants are too small to suckle at breast. For many mothers this becomes difficult and milk volume is not maintained or there are difficulties storing and transporting the milk safely.

The alternative that is supported by the AAP is provision of human milk purchased from milk banks and provided to preterm infants in lieu of formula. Recently, there has been an escalation in the use of banked donor milk in neonatal intensive care units (NICUs), rising from 25.1% nationally in 2007 to 45.2% in 2011 (p<0.001) (Perrine & Scanlon, Prevalence of use of human milk in US advanced care neonatal units. Pediatrics. 2013; 131(6):1066-1071). This steady increase reached an all-time high of 2.15 million ounces of human banked donor milk dispensed by the Human Milk Banking Association of North America in 2011 (Updegrove, Nonprofit human milk banking in the United States [published online Jul. 29, 2013]. J Midwifery Womens Health. doi:10.1111/j.1542-2011.2012.00267.x).

Women who donate milk to milk banks (non-profit and profit) are screened carefully before being determined to be eligible. Milk produced by donor milk banks is pasteurized by the Holder method (62.5° C. for 30 minutes) to remove harmful bacteria and viruses. It is then pooled, packaged, and sold to hospitals for use in their NICUs. The banked donor milk available for purchase from milk banks is pooled from several donors and is more likely to be from mothers who delivered term versus preterm infants (Edwards & Spatz, Making the case for using donor human milk in vulnerable infants. Adv Neonatal Care. 2012 October; 12(5):273-8; quiz 279-80). This is an important distinction as preterm MOM (milk produced by mothers delivering infants at less than 37 weeks gestation) is qualitatively different from term MOM (milk produced by mothers delivering at or after 37 weeks). The literature describes benefits of banked donor milk versus formula, but there are far fewer studies comparing banked donor milk to MOM (Espinosa-Martos, et al., Bacteriological, biochemical, and immunological modifications in human colostrum after Holder pasteurisation. J Pediatr Gastroenterol Nutr. 2013 May; 56(5):560-8; Ewaschuk, et al., Effect of pasteurization on immune components of milk: implications for feeding preterm infants. Appl Physiol Nutr Metab. 2011 April; 36(2):175-82). Since 2011, only 3 additional studies have addressed differences in CCGF between banked donor milk and MOM (Espinosa-Martos, et al., Bacteriological, biochemical, and immunological modifications in human colostrum after Holder pasteurisation. J Pediatr Gastroenterol Nutr. 2013 May; 56(5):560-8; Reeves, et al. TGF-β2, a protective intestinal cytokine, is abundant in maternal human milk and human-derived fortifiers but not in donor human milk. Breastfeed Med. 2013 December; 8(6):496-502; Ewaschuk, et al. Effect of pasteurization on selected immune components of donated human breast milk. J Perinatol. 2011 September; 31(9):593-8; Groer, et al., Cytokines, Chemokines, and Growth Factors in Banked Human Donor Milk for Preterm Infants. J Hum Lact. 2014 Mar. 24; 30(3):317-323).

Holder pasteurization not only destroys bacteria, viruses, and cells but also destroys or significantly reduces levels of immune proteins such as secretory Immunoglobulin A (sIgA) (Ewaschuk et al., Effect of pasteurization on immune components of milk: implications for feeding preterm infants. Appl Physiol Nutr Metab. 2011 April; 36(2):175-82). Immunoglobulin A, the major antibody in human milk, showed a 45% reduction after pasteurization (McPherson & Wagner, The effect of pasteurization on transforming growth factor alpha and transforming growth factor beta 2 concentrations in human milk. Adv Exp Med Biol. 2001; 501:559-66; Braga & Palhares, Effect of evaporation and pasteurization in the biochemical and immunological composition of human milk. J Pediatr (Rio J). 2007 January-February; 83(1):59-63). Lactoferrin, lysozyme, and bile salt-stimulated lipase in milk are also significantly reduced by Holder pasteurization (Christen, et al., Ultrasonication and the quality of human milk: variation of power and time of exposure. J Dairy Res. 2012 August; 79(3):361-6). Heat denaturation of proteins could reduce the concentrations of other immune molecules such as cytokines, chemokines, and growth factors (CCGF), but the effects on only a few of these have been measured.

For example, one study found Holder pasteurization did not markedly affect lactose, glucose, or myoinositol concentrations in milk, but did result in the formation of lactulose and an increase in furosine concentrations (Espinosa-Martos, et al., Bacteriological, biochemical, and immunological modification in human colostrum after Holder pasteurization. J Pediatr Gastroenterol Nutr. 2013 May; 56(5):560-8).

There has been a general assumption that Holder pasteurization not only destroys bacteria, viruses, and cellular components, but also destroys or significant reduces immune proteins such as secretory Immunogloulin A. (Ewaschuk, et al., Effect of pasteurization on immune components of milk: implications for feeding preterm infants. Appl Physiol Nutr Metab, 2011 April; 36(2):175-82). Secretory IgA showed a 45% reduction after pasteurization (Braga & Palhares, (2007). Effect of evaporation and pasteurization in the biochemical and immunological composition of human milk. *J Pediatr (Rio J)*, 83(1), 59-63; McPherson & Wagner, The effect of pasteurization on transforming growth factor alpha and transforming growth factor beta 2 concentrations in human milk. Adv Exp Med Biol. 2001; 501:559-66) the major antibody in human milk. All of the cells in milk are destroyed by this process and heat denaturation of proteins would be likely to reduce the concentrations of immune molecules such as cytokines, chemokines and growth factors (CCGF). Few cytokines have been specifically assayed. IL-10 and eythopoietin were both reported to be markedly reduced by Holder pasteurization, while epidermal growth factor (EGF) concentrations were not reduced, although all values were low before pasteurization as the mean month of lactation was 8 months, and all cytokines are higher in early lactation (Untalan, et al., Heat susceptibility of interleukin-10 and other cytokines in donor human milk. Breastfeed Med. 2009 September; 4(3):137-44). Some cytokines appear preserved after Holder pasteurization, such as TGF-β (McPherson & Wagner, The effect of pasteurization on transforming growth factor alpha and transforming growth factor beta 2 concentrations in human milk. Adv Exp Med Biol. 2001; 501:559-66). As noted in a recent review, a thorough evaluation of the effects of pasteurization on human milk is lacking (Ewaschuk, et al., Effect of pasteurization on immune components of milk: implications for feeding preterm infants. Appl Physiol Nutr Metab, 2011 April; 36(2):175-82).

Microbiota, cells, immunoglobulins, lysozyme, lactoferrin, and oligosaccharides in human milk were reported to be reduced after Holder pasteurization, but only 3 studies analyzing a limited number of CCGF had been done (McPherson & Wagner, The effect of pasteurization on transforming growth factor alpha and transforming growth factor beta 2 concentrations in human milk. Adv Exp Med Biol. 2001; 501:559-66; Untalan, et al., Heat susceptibility of interleukin-10 and other cytokines in donor human milk. *Breastfeed Med.* 2009 September; 4(3):137-44; Goelz, et al., Effects of different CMV-heat-inactivation-methods on growth factors in human breast milk. 2009 April; 65(4):458-61). Cytokines, chemokines, and growth factors in milk are believed to play important roles in gastrointestinal and immune development of the recipient infant (Oddy, The impact of breastmilk on infant and child health. *Breastfeed Rev.* 2002 November; 10(3):5-18). They affect immune modulation, maturation, and integrity of the gastrointestinal tract as well as control of inflammation in the developing recipient infant (Garofalo, Cytokines in human milk. J Pediatr. 2010 February; 156(2 Suppl):S36-40). The chemokines play a role in cellular chemoattraction and activation of neutrophils, monocytes, and lymphocytes (Garofalo, Cytokines in human milk. J Pediatr. 2010 February; 156(2 Suppl):S36-40). Cytokines, chemokines, and growth factors (CCGF) probably prime intestinal immune cells, contribute to angiogenesis, help develop the intestinal epithelial barrier function, and generally suppress inflammation (Newburg & Walker, Protection of the neonate by the innate immune system of developing gut and of human milk. Pediatr Res. 2007 January; 61(1):2-8). These effects may be even more important when infants are born preterm and therefore have limited in utero development of their physiological systems (Newburg & Walker, Protection of the neonate by the innate immune system of developing gut and of human milk. Pediatr Res. 2007 January; 61(1): 2-8) Milk produced by donor milk banks is pasteurized by the Holder method (62.5° C. for 30 minutes) to destroy harmful bacteria and viruses (Updegrove, Nonprofit human milk banking in the United States. *J Midwifery Womens Health.* 2013 September; 58(5):502-8).

Preterm infants' risks for necrotizing enterocolitis (Sullivan, et al., An exclusively human milk-based diet is associated with a lower rate of necrotizing enterocolitis than a diet of human milk and bovine milk-based products. J Pediatr. 2010 April; 156(4):562-7), sepsis (Schanler, et al., Feeding strategies for premature infants: beneficial outcomes of feeding fortified human milk versus preterm formula. Pediatrics. 1999 June; 103(6 Pt 1):1150-7), and adverse neurodevelopment (Vohr, et al., Persistent beneficial effects of breast milk ingested in the neonatal intensive care unit on outcomes of extremely low birth weight infants at 30 months of age. Pediatrics. 2007 October; 120(4):e953-9) are significantly reduced when infants receive human milk, but these protective effects could be affected by extensive or exclusive use of banked donor milk if there are lower levels of critical immune molecules.

In light of the dearth of information on the relationship between CCGF in banked donor milk and MOM, along with the importance of immunological proteins, and lactation proteins, in the development in early neonatal life, methods of supplementing donor breast milk and formula are needed in the art.

SUMMARY OF THE INVENTION

CCGF in milk are believed to play important roles in gastrointestinal and immune development of the recipient infant.

As donor milk becomes more available and used more widely, the effects of pasteurization on immune components may translate into differential risk for these infants. Preterm infants' risks for necrotizing enterocolitis (Sullivan, et al., (2010). An exclusively human milk-based diet is associated with a lower rate of necrotizing enterocolitis than a diet of human milk and bovine milk-based products. *J Pediatr,* 156 (4), 562-567 e561), sepsis (Schanler, et al., (1999). Feeding strategies for premature infants: beneficial outcomes of feeding fortified human milk versus preterm formula. *Pediatrics,* 103(6 Pt 1), 1150-1157), and adverse neurodevelopment (Vohr, et al., (2007). Persistent beneficial effects of breast milk ingested in the neonatal intensive care unit on outcomes of extremely low birth weight infants at 30 months of age. *Pediatrics,* 120(4), e953-959) in particular are significantly reduced when infants receive human milk (usually with added human milk fortifier), but the protective effects may be diminished by the exclusive use of donor milk if there is a diminution of critical immune molecules.

As such, a method is presented for supplementing breast milk. Pasteurized breast milk is obtained and tested for at least one protein factor. The protein factor in the pasteurized breast milk is a cytokine, chemokine, or growth factor. Examples of the protein factor are IL-4, MCP-1, MIP-1α, and a combination of these factors. Levels of the protein factor were compared to levels obtained from preterm milk, and low or deficient levels of the protein factor or factors are supplemented by adding one or more additives to the breast milk, where the additive is one or more cytokine, chemokine, or growth factors. Where levels of the protein factor are low or deficient, IL-4, MCP-1, MIP-1α can be added. For example, factors can be supplemented to bring levels of the protein factor within the range of 9 pg/ml to 151 pg/ml for IL-4, 75 pg/ml to 10400 pg/ml for MCP-1, and 10 pg/ml to 493 pg/ml for MIP1α. Nonlimiting examples of levels for IL-4 include 10 pg/ml, 13 pg/ml, 13.54 pg/ml, 15 pg/ml, 15.7 pg/ml, 20 pg/ml, 30 pg/ml, 40 pg/ml, 50 pg/ml, 60 pg/ml, 70 pg/ml, 80 pg/ml, 90 pg/ml, 100 pg/ml, 110 pg/ml, 120 pg/ml, 130 pg/ml, 140 pg/ml, and 150 pg/ml. Nonlimiting examples of levels for MCP-1 include 75 pg/ml, 80 pg/ml, 85 pg/ml, 90 pg/ml, 100 pg/ml, 110 pg/ml, 120 pg/ml, 130 pg/ml, 140 pg/ml, 150 pg/ml, 200 pg/ml, 250 pg/ml, 300 pg/ml, 350 pg/ml, 400 pg/ml, 450 pg/ml, 500 pg/ml, 550 pg/ml, 600 pg/ml, 650 pg/ml, 700 pg/ml, 750 pg/ml, 800 pg/ml, 850 pg/ml, 900 pg/ml, 950 pg/ml, 1000 pg/ml, 2000 pg/ml, 3000 pg/ml, 4000 pg/ml, 5000 pg/ml, 6000 pg/ml, 7000 pg/ml, 8000 pg/ml, 9000 pg/ml, 10000 pg/ml, 10100 pg/ml, 10200 pg/ml, 10300 pg/ml, 10400 pg/ml. Nonlimiting examples of levels for MIP1α include 10 pg/ml, 15 pg/ml, 20 pg/ml, 25 pg/ml, 30 pg/ml, 35 pg/ml, 40 pg/ml, 50 pg/ml, 60 pg/ml, 75 pg/ml, 80 pg/ml, 85 pg/ml, 90 pg/ml, 100 pg/ml, 110 pg/ml, 120 pg/ml, 130 pg/ml, 140 pg/ml, 150 pg/ml, 200 pg/ml, 250 pg/ml, 300 pg/ml, 350 pg/ml, 400 pg/ml, 450 pg/ml, and 493 pg/ml.

Additional factors can be supplemented in the breast milk. At least one supplemental protein factor is tested, where the supplemental protein factor is IL-10, IL-6, IP-10, TNF-α, IL-8, or a combination of these factors. Where levels of the supplemental protein factor are low or deficient, IL-10, IL-8, IP-10, TNF-α, or a combination of these factors can be added. For example, factors can be supplemented to bring levels of the supplemental protein factor within the range of 8 pg/ml to 98 pg/ml for IL-10, 17 pg/ml to 117 pg/ml for IL-6, 18 pg/ml to 254 pg/ml for TNF-α. Nonlimiting examples of levels for IL-10 include 10 pg/ml, 11 pg/ml, 11.8 pg/ml, 12 pg/ml, 13 pg/ml, 13.54 pg/ml, 15 pg/ml, 15.7 pg/ml, 20 pg/ml, 30 pg/ml, 40 pg/ml, 50 pg/ml, 60 pg/ml, 70 pg/ml, 80 pg/ml, 90 pg/ml, and 98 pg/ml. Nonlimiting examples of levels for IL-6 include 17.69 pg/ml, 18 pg/ml, 20 pg/ml, 25 pg/ml, 26.9 pg/ml, 28 pg/ml 30 pg/ml, 35 pg/ml, 40 pg/ml, 50 pg/ml, 60 pg/ml, 75 pg/ml, 80 pg/ml, 85 pg/ml, 90 pg/ml, 100 pg/ml, 110 pg/ml, and 117 pg/ml. Nonlimiting examples of levels for TNF-α include 18 pg/ml, 20 pg/ml, 21.17 pg/ml, 23.2 pg/ml, 24 pg/ml, 25 pg/ml, 30 pg/ml, 40 pg/ml, 50 pg/ml, 60 pg/ml, 70 pg/ml, 80 pg/ml, 90 pg/ml, 100 pg/ml, 110 pg/ml, 120 pg/ml, 130 pg/ml, 140 pg/ml, and 150 pg/ml. 160 pg/ml, 170 pg/ml, 180 pg/ml, 190 pg/ml, 200 pg/ml, 210 pg/ml, 220 pg/ml, 230 pg/ml, 240 pg/ml, 250 pg/ml, and 254 pg/ml. In specific variations of the invention, EGF is added to remediate low levels or deficient levels in EGF.

In some variations, the breast milk is pasteurized by treatment at 62.5° C. for 30 minutes, 63° C. for 30 minutes, 62° C. for 5 seconds, 65° C. for 5 seconds, or 72° C. for 5 seconds. Optionally, the breast milk is preterm milk, such as human preterm milk.

In certain variations of the invention, at least one lactation protein is also added. Examples of the lactation protein are lysozyme, lactoferrin, and a combinations of these proteins. The lactation protein is optionally added to reach a level of lysozyme of between about 63 g/L and about 173 g/L, and/or a level of lactoferrin of between about 0.78 g/L and about 1.33 g/L.

The methods presented herein may alternatively be used to supplement formula. In variations of the invention pertaining to formula, formula is obtained and supplemented with at least one protein factor in preterm milk to bring the at least one protein factor to levels equivalent to those found in preterm milk. The protein factor is IL-4, MCP-1, MIP-1α, or a combination of the aforementioned factors. The protein factor or factors are optionally supplemented by adding one or more additives to reach levels or ranges of the protein factor disclosed above. In some variations, additional factors can be supplemented in the formula. At least one supplemental protein factor is added to the formula, where the supplemental protein factor is IL-10, IL-6, IP-10, TNF-α, IL-8, or a combination of these factors. In further variations, the supplemental protein factor is supplemented to bring levels of the supplemental protein factor within a level or range as disclosed above. In specific variations of the invention, EGF is added to remediate low levels or deficient levels in EGF. In certain variations of the invention, at least one lactation protein is also added. Examples of the lactation protein are lysozyme, lactoferrin, and a combinations of these proteins. The lactation protein is optionally added to reach levels as disclosed above.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
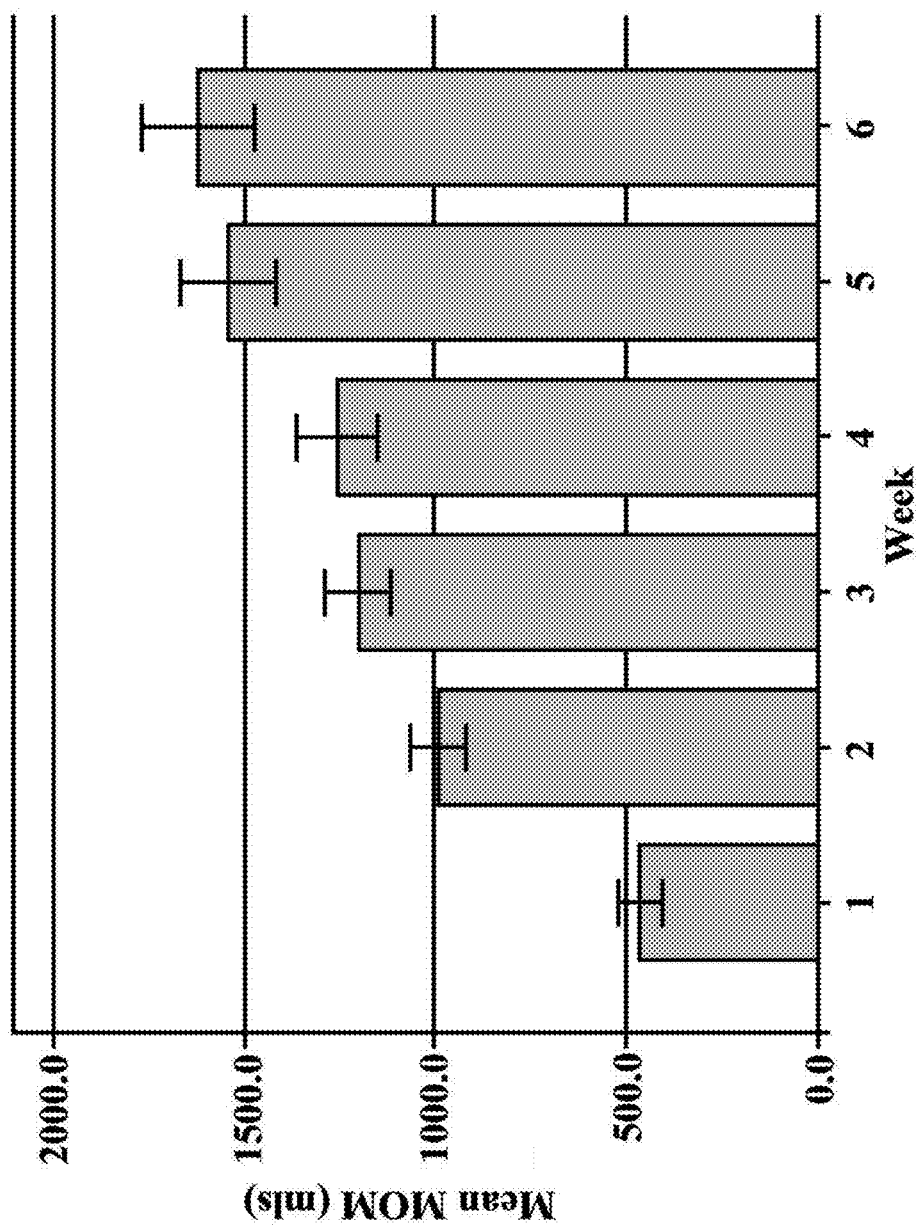
FIG. 1 is a graph showing Mothers' Own Milk (MOM) Volumes (mL/wk) over 6 weeks of Neonatal Intensive Care Unit (NICU) stay. Values shown are mL of MOM produced over 1-week time spans beginning from the end of week 1 to the end of week 6 of a NICU stay. For week 1, n=45; for week 2, n=36; for week 3, n=36; for week 4, n=33; for week 5, n=26; for week 6, n=20. Bars are standard errors of the mean.

As used herein, the singular forms "a," "an" and "the" include plural referents unless the context clearly dictates otherwise. Thus, for example, reference to "a polypeptide" includes a mixture of two or more polypeptides and the like.

As used herein, "about" means approximately or nearly and in the context of a numerical value or range set forth means±15% of the numerical.

As used herein the term "patient" is understood to include an animal, especially a mammal, and more especially a human that is receiving or intended to receive treatment.

As used herein "animal" means a multicellular, eukaryotic organism classified in the kingdom Animalia or Metazoa. The term includes, but is not limited to, mammals. Nonlimiting examples include rodents, mammals, aquatic mammals, domestic animals such as dogs and cats, farm animals such as sheep, pigs, cows and horses, and humans. Wherein the terms "animal" or the plural s are used, it is contemplated that it also applies to any animals.

As used herein "pasteurize" or "pasteurized" means to subject a material to a treatment process to reduce the number of pathogens on or within the material. The treatment process includes subjecting the material to sufficient heat for a sufficient time frame or filtration, thereby rendering microbes, molds, and viruses non-viable or inactive, without substantially altering the chemical composition of the material. The terms "pasteurize" or "pasteurized" are intended to encompass the terms "sterilize" and "sterilization" where the treated material is substantially free of microbial and mold growth or viral load/infectivity. Examples of pasteurization include Holder pasteurization, wherein the material is heated to 62.5° C. for 30 minutes or 63° C. for 30 minutes (Czank, et al., Retention of the immunological proteins of pasteurized human milk in relation to pasteurizer design and practice. Pediatr Res. 2009 October; 66(4):374-9; Goelz, et al., Effects of different CMV-heat-inactivation-methods on growth factors in human breast milk. Pediatr Res. 2009 April; 65(4): 458-61); high-temperature, short-time (HTST, i.e. "flash") pasteurization wherein the material is flowed against a plurality of thermally-conductive plates and rapidly heated to 72° C. (161° F.) for 15 seconds; ultra-heat-treating (UHT), wherein the material is rapidly heated to 140° C. (284° F.) for four seconds; 62° C. for 5 seconds, 65° C. for 5 seconds, or 72° C. for 5 seconds (Goelz, et al., Effects of different CMV-heat-inactivation-methods on growth factors in human breast milk. Pediatr Res. 2009 April; 65(4):458-61).

As used herein "cytokine" means a small protein, polypeptide, or active fragment, which is released by a cell to alter the behavior of another cell, i.e. mediates interactions between cells. Cytokines are typically between 5 and 20 kilodaltons (kDa). The protein acts through a receptor to induce a cell signaling response. Nonlimiting examples of cytokines contemplated here include lymphokines, interferons (IFNs), colony stimulating factors (CSFs), interleukins (ILs) (including IL-10), CD antigens and tumor necrosis factors (TNFs). The cytokines can include homodimeric cytokines, i.e. signaling molecules formed from two identical subunits, and heterodimeric cytokines, i.e. signaling molecules formed from two distinct subunits. A nonlimiting example of a heterodimeric cytokine is interleukin-12 (IL-12), which is formed from a p35 subunit and a p40 subunit.

As used herein "chemokine" (chemotactic cytokine) means a protein, polypeptide, or active fragment, which is released by a cell resulting in chemotaxis, i.e. the ability to directly stimulate directed movement of cells, Chemokines are typically between 8 and 10 kilodaltons (kDa) and generally possess conserved regions with four cysteine residues including cys-cys or cys-X-cys. The protein acts through a G-protein-linked receptor to induce a cell signaling response. Chemokines are classified into four main subfamilies: CXC, CC, CX3C and XC. Chemokines include, without limiting the scope of the invention, RANTE5, MIP-1α, MIP-1β, SDF-1. Tests to determine if a polypeptide possesses chemotactic activity for a population of cells can be readily determined by employing any known assay for cell chemotaxis to determine induction or prevention of chemotaxis. Such assays measure the ability of a protein to induce the migration of cells across a membrane as well as the ability of a protein to induce the adhesion of one cell population to another cell population, such as, without limitation, those described in: Current Protocols in Immunology, Ed, by J. E. Coligan, A. M. Kruisbeek, D. H. Margulies, E. M. Shevach, W. Strober, Pub. by Greene Publishing Associates and Wiley-Interscience (Chapter 6.12, Measurement of alpha and beta Chemokines 6.12.1-6.12.28); Taub et al., J. Clin. Invest. 95:1370-1376, 1.995; Lind et al., APMIS 103:140-146, 1995: Muller et al., Eur. J. Immunol, 25: 1744-1748: Gruber et al., J. of Immunol. 152:5860-5867, 1994; Johnston et al., J. of Immunol. 153: 1.762-1768, 1994; all of which are incorporated herein by reference.

As used herein "growth factor" means a naturally occurring protein or steroid compound possessing the ability to stimulate cell growth, proliferation, healing or differentiation.

As used herein "preterm milk" means milk produced by mammary glands of mothers whom delivered infants "preterm".

As used herein "preterm" means an infant delivery that occurs before 37 weeks of gestation. The term includes spontaneous preterm delivery and medically induced preterm delivery. Spontaneous preterm delivery (sPTD) means spontaneous delivery 20 to <36 weeks gestation, and includes, without being limited to the specific embodiment, very preterm delivery (VPTD), which mean 20-<33 weeks gestation; moderate preterm delivery (MPTD), which is 33-<36 weeks gestation; spontaneous preterm labor/delivery (sPTL, clinical presentation of sPTD), and spontaneous preterm premature rupture of membranes (PPROM).

As used herein "remediate" means to elevate one or more cytokine levels, chemokine levels, growth factor levels, or lactation protein level to a level within a normal range for the cytokine, chemokine, growth factor, or lactation protein in preterm milk. A normal range is defined as a range of 1 or 2 standard deviations of levels of the cytokine, chemokine, growth factor, or lactation protein obtained from a plurality of samples of preterm milk, based on statistical analysis. As used in the definition, lactation proteins include lysozyme, lactoferrin, and lipase.

As used herein "low levels" means a level of a cytokine, chemokine, growth factor, or lactation protein that is 70%, or less, of the value found in preterm milk. The value used for determining low levels can be the mean value of the cytokine, chemokine, growth factor, or lactation protein in preterm milk, the value representing the lower range for the cytokine, chemokine, growth factor, or lactation protein in preterm milk, or the value representing the upper range for the cytokine, chemokine, growth factor, or lactation protein in preterm milk.

As used herein "deficient levels" means a level of a cytokine, chemokine, growth factor, or lactation protein that is absent or up to 10%, or less, of the value found in preterm milk. The value used for determining low levels can be the mean value of the cytokine, chemokine, growth factor, or lactation protein in preterm milk, the value representing the lower range for the cytokine, chemokine, growth factor, or lactation protein in preterm milk, or the value representing the upper range for the cytokine, chemokine, growth factor, or lactation protein in preterm milk.

Example 1

Mothers of preterm infants less than 1500 g were consented when their newborns were admitted to the hospital NICU. Collection of mother's own milk was obtained after obtaining informed consent, and samples collected by the end of the first week of admission. Exclusion criteria were moribund status, major congenital anomalies, HIV positive status of mothers. A demographic questionnaire was conducted and infant data, including medical complications, weight, feeding and date of discharge, were obtained from nursing and medical charts.

There were 45 maternal infant dyads included in the analysis. The majority of mothers were high school graduates (58%), were single (49%), were poor (income under $25,00/year) (53%), and were primiparous (34%). There were 25% smokers, and 4% self-reported illegal drug use. The mean BMI was 27.6±6.4. The racial composition was 53% Caucasian, 41% African American, 2% Asian-American and 2% other. Twenty four percent considered themselves of Hispanic ethnicity. There were equal numbers of boys and girls born. The infants were evaluated using the appearance, pulse, grimace, activity, respiration (APGAR) test, with each factor having a score of 0, 1, or 2. The mean 2 minute APGAR was 5.93 and the 5 minute APGAR was 7.9. The mean birth weight was 1107±223 g, with a mean gestational age of 28.3±2.33 weeks.

All mothers were encouraged to lactate and provide milk throughout their infants' stay in the NICU. Twenty-five pooled samples of banked donor milk were analyzed and compared to 196 pooled weekly samples of mothers own milk (which represented nearly 2000 samples of daily milk collection). The weeks of collection were from week 1 through week 6 of the infant's admission to the NICU, or until the mother ceased providing mother's own milk (MOM). The number of mothers providing MOM declined over time due to hospital discharge before 6 weeks (N=10), neonatal death (N=2), and change from MOM to formula (N=9) or to banked donor milk (N=8) between weeks 2 to 6. Table 1 shows the number of infants receiving exclusive breast milk by week of admission. This data generally presents the decline in exclusive breast milk feeding.

TABLE 1

Number of infants receiving exclusive mothers' own milk over time (n = 41).

| Week 1 | Week 2 | Week 3 | Week 4 | Week 5 | Week 6 |
|---|---|---|---|---|---|
| 38 | 32 | 32 | 29 | 22 | 18 |
| 93% | 78% | 78% | 71% | 54% | 44% |

Many mothers provided MOM for the first week or two and then there was a drop off. Donor milk was acquired from banks that specify the donor mothers test negative for HIV, human t-cell lymphotrophic virus, hepatitis B and C, and syphilis, who do not smoke, who drink no more than 2 alcoholic drinks per day, do not use illegal drugs, and breast-feed an infant of 1 year of age or less. Exact volumes of MOM, human milk fortifier (bovine-based), formula, and donor milk were recorded at every feeding. The donor milk being given with greater frequency in the past six months was purchased from a single non-profit milk bank in Northern Texas. This milk was shipped frozen in aliquots and thawed and measured and either mixed with mother's own milk if it is available or given as the full feeding, the amount determined by the caloric needs of the infant each day.

At each feeding an aliquot of 0.5 ml of milk was removed by tuberculin syringe by the nurse, prior to fortifier, formula, or banked donor milk supplementation, and was labeled and frozen at −20° C. until pickup and delivery to the lab within 2-3 days. The donor milk being used for some infants was also treated in the same manner as the mother's own milk, and supplemental donor milk was collected prior to addition to MOM as described above. The frozen samples for each week were thawed, pooled, centrifuged at 1000 g at 4° C. for 10 minutes, defatted by spooning the fat layer using a Corning spoon No. 3004 (ThermoFisher Scientific, Waltham, Mass.). The whey fraction was filtered through a 0.45 μm Millipore low protein binding PVDF filter (No. SLHVM23N S; ThermoFisher Scientific, Waltham, Mass.) then refrozen at −80° C. in 2 ml Eppendorf tubes (Eppendorf AG, Hamburg, Germany) until analysis. It was noted that MOM samples underwent more than one freezing-thaw cycle, while banked donor milk also went through more freeze-thaw cycles than MOM, which may have further reduced CCGF concentrations. However, previous studies have shown up to 3 freeze-thaw cycles do not significantly alter milk CCGF levels (unreported data; Ramirez-Santana, et al. Effects of cooling and freezing storage on the stability of bioactive factors in human colostrum. *J Dairy Sci.* 2012; 95(5):2319-2325).

The volumes of MOM produced by the mothers over the 6 weeks of data collection increased over time (<500 mL/week at week 1 to >1500 mL/week at week 6), as seen in FIG. 1.

The weekly-pooled whey was analyzed through multiplexing with the use of Millipore magnetic bead kits (EMD Millipore, Billerica, Mass.) according to kit directions and analyzed on a MagPix (Luminex Corp., Austin, Tex.). Before analysis a series of experiment were done spiking different matrix solutions to optimize the assay.

Multiplexing allows for quantitative measurements of multiple analytes in a small volume of fluid (25 μL) and is based on attachment of the CCGF to magnetic beads and processing using LED excitation. The MAGPIX machine was calibrated and the kits' standards and controls used to determine the values in pg/mL of the CCGF. Before analysis, a series of experiments were performed by spiking known concentrations of CCGF in different matrix solutions to optimize the multiplex assay. The matrix solution that produced the best recovery (up to 100% for some CCGF) was used for all subsequent analysis. This was a commercial serum matrix used for serum and plasma analyses and was purchased from Millipore and added to standards, controls, and samples. The CCGF analyzed were epidermal growth factor (EGF), interleukin-4 (IL-4), interleukin-6 (IL-6), interleukin-8 (IL-8), tumor necrosis factor-α (TNF-α), interleukin-10 (IL-10), macrophage inflammatory protein-α (MIP-1α), monocyte chemotactic protein (MCP), and interferon gamma inducible protein-10 (IP-10), as seen in Tables 2 and 3. This panel of cytokines, chemokines, and growth factors was chosen due to differences in the protein concentrations in preterm versus term milk and they are all reported to be biologically active in human milk (Chatterton, et al. Anti-inflammatory mechanisms of bioactive milk proteins in the intestine of newborns. *Int J Biochem Cell Biol.* 2013; 45(8):1730-1747).

TABLE 2

Cytokine, chemokine, and growth factor data for week 1 of preterm mother's own milk (pg · mL).

|      | N  | Minimum | Maximum | Mean     | Std. Deviation |
|------|----|---------|---------|----------|----------------|
| EGF  | 43 | 242     | 21043   | 11302.48 | 5845.865       |
| IL10 | 43 | 0       | 88      | 11.80    | 20.647         |
| IL4  | 43 | 0       | 151     | 13.54    | 30.840         |
| IL8  | 43 | 2       | 19224   | 770.76   | 2956.833       |
| IL6  | 43 | 1       | 117     | 26.90    | 27.761         |
| IP10 | 43 | 257     | 14515   | 2461.88  | 3580.585       |
| MCP1 | 43 | 89      | 10400   | 2714.39  | 2834.137       |
| MIP1 | 43 | 0       | 493     | 38.63    | 99.312         |
| TNFa | 43 | 2       | 110     | 23.19    | 22.030         |

TABLE 3

Cytokine, chemokine, and growth factor data for week 2 of preterm mother's own milk (pg · mL).

|      | N  | Minimum | Maximum | Mean     | Std. Deviation |
|------|----|---------|---------|----------|----------------|
| EGF  | 37 | 1403    | 18149   | 11821.46 | 5277.679       |
| IL10 | 37 | 0       | 98      | 11.83    | 19.816         |
| IL4  | 37 | 0       | 109     | 15.71    | 28.461         |
| IL8  | 37 | 2       | 1497    | 150.44   | 296.706        |
| IL6  | 37 | 0       | 95      | 17.69    | 20.370         |

TABLE 3-continued

Cytokine, chemokine, and growth factor data for week 2 of preterm mother's own milk (pg · mL).

|      | N  | Minimum | Maximum | Mean    | Std. Deviation |
|------|----|---------|---------|---------|----------------|
| IP10 | 37 | 261     | 9464    | 1991.37 | 2220.565       |
| MCP1 | 37 | 75      | 9342    | 1897.25 | 2413.097       |
| MIP1 | 37 | 0       | 165     | 13.17   | 29.612         |
| TNFa | 37 | 0       | 254     | 21.17   | 41.228         |

The levels of CCGF were compared between MOM at each lactational week and the pooled banked donor milk. The data for both sample groups were not normally distributed, thus differences were analyzed by Mann-Whitney U tests. To compare changes in MOM CCGF levels from week 1 to week 6, the CCGF were $\log_{10}$ transformed and t tests between weeks 1 and 6 were performed for each protein. A p value of 0.05 was accepted for statistical significance and SPSS, version 21 (International Business Machines Corporation, Armonk, N.Y.), was used for analysis. Graphs of cytokines and growth factors depict the $\log_{10}$ on the vertical axis due to the large differences in concentrations between EGF and the chemokines.

Analysis of the donor milk showed that cytokines were present in the donor milk samples. In the first week, there were statistically significant differences between MOM and banked donor milk for all but 3 CCGF (IL-4, EGF, MIP-1α). By week 6, the only CCGF levels that were significantly different were MIP-1α and TNF-α. All other CCGF levels were not significantly different in MOM at 6 weeks versus banked donor milk, as seen in Table 4.

TABLE 4

Comparison of CCGF in preterm mother's own milk using Mann Whitney U, collected from weeks 1 through 6 of NICU hospitalization, to banked donor milk.[a]

| Week # | IL-10 | IL-4 | IL-6 | TNF-α | EGF | IP-10 | MCP-1 | MIP-Iα | IL-8 |
|---|---|---|---|---|---|---|---|---|---|
| 1*   | −3.02[c]  | −0.91  | −4.3[d]   | −5.13[d]  | 1.13   | −3.88[d]  | −3.32[d]  | −1.35   | −4.21[d]  |
| 2**  | −2.47[b]  | −1.37  | −3.17[d]  | −4.3[d]   | −1.26  | −3.61[d]  | −2.4[b]   | −0.253  | −2.08[b]  |
| 3**  | −0.575    | −1.23  | −2.33[b]  | −3.94[d]  | −1.07  | −3.26[d]  | −1.67     | −1.67   | −1.8      |
| 4†   | −0.628    | −0.436 | −1.84     | −3.56[d]  | −0.36  | −3.2[d]   | −1.37     | −1.99[b]| −1.12     |
| 5††  | −0.134    | −0.024 | 0.801     | −2.48[b]  | −0.27  | −1.69     | −0.452    | −1.6    | −0.63     |
| 6‡   | −0.012    | −0.095 | −0.549    | −2.25[b]  | −0.289 | −0.754    | −0.297    | −2.14[b]| −0.89     |

Abbreviations: CCGF, cytokines, chemokines, and growth factors; EGF, epidermal growth factor; IL, interleukin; IP, interferon gamma inducible protein; MCP, monocyte chemotactic protein; MIP, macrophage inflammatory protein; NICU, neonatal intensive care unit; TNF, tumor necrosis factor.
*N = 44;
**N = 36;
†N = 33;
††N = 26;
‡N = 20.
[a] Data are Mann-Whtney U Z values in preterm MOM CCGF compared to donor milk CCGF (N = 25).
[b] $p < 0.05$;
[c] $p < 0.01$;
[d] $p < 0.001$.

Figure 2:
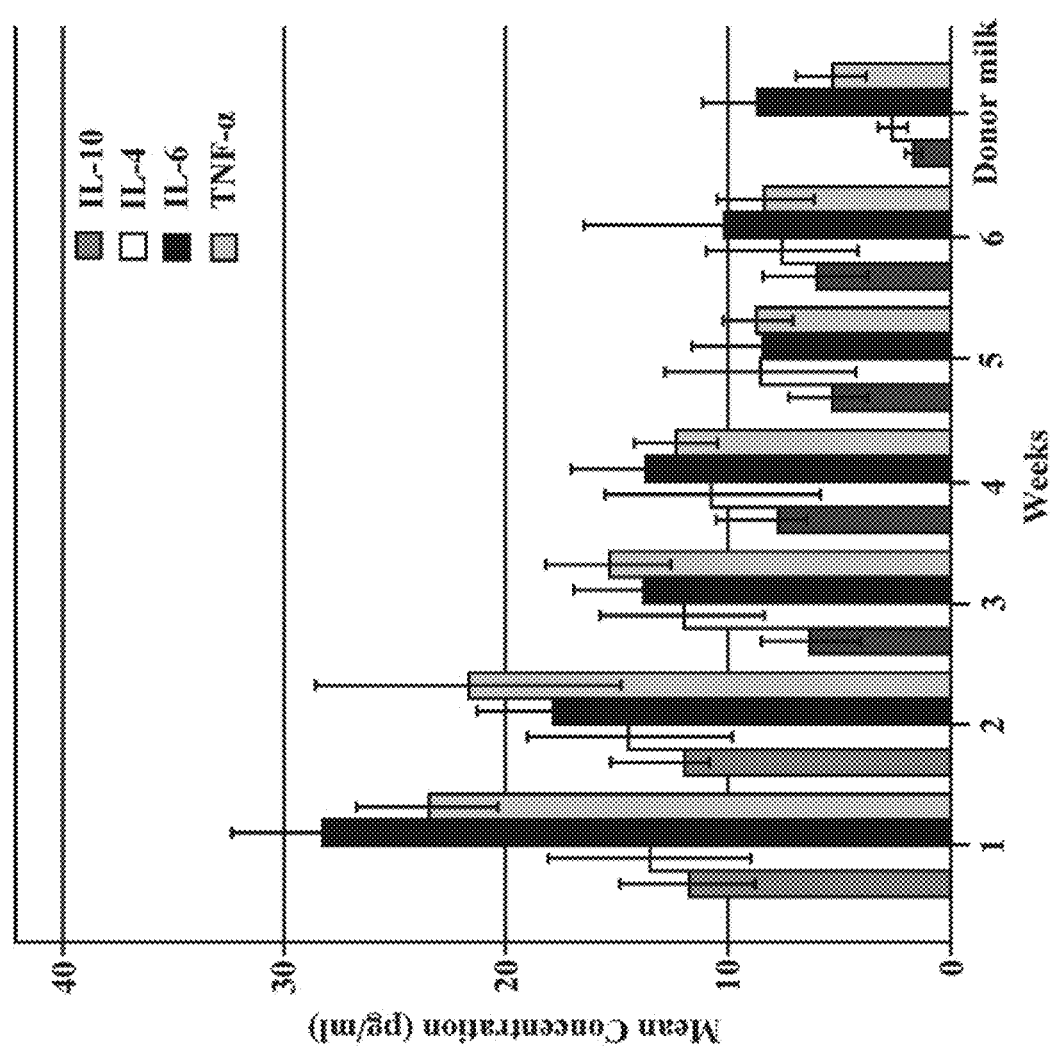
FIG. 2 is a graph showing the average (mean) of cytokines from preterm Mothers' Own Milk over time compared to banked donor milk. Error bars represent standard errors of the means.
Figure 3:
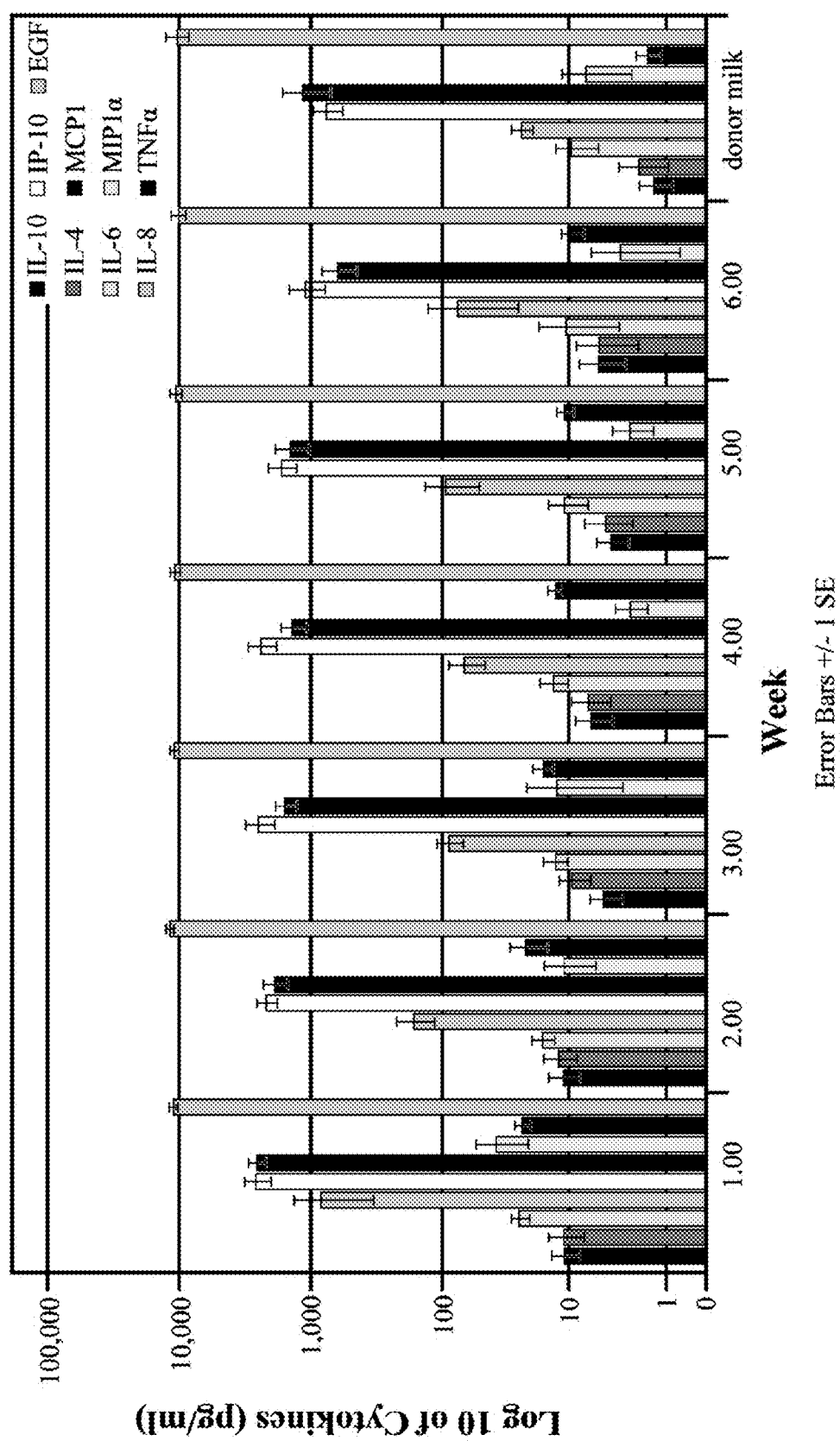
FIG. 3 is a graph of the $\log_{10}$ of chemokine and growth factor averages in preterm Mothers' Own Milk over time compared to banked donor milk. Error bars represent standard errors of the means.

FIG. 2 depicts the mean levels of the 4 cytokines from weeks 1 to 6 for MOM and the levels in banked donor milk. The level of each cytokine generally decreased over time, but the difference between week 1 and week 6 was statistically significant only for TNF-α (t=4.38, df=62, p<0.001) and IL-6 (t=5.28, df=62, p<0.001). FIG. 3 shows the $\log_{10}$ means of the cytokines and growth factors over time for MOM over the course of the study, i.e. from weeks 1 through 6, and the levels found in banked donor milk. There is a significant decline over time in the levels of each cytokine, with the exception of EGF, while chemokines and growth factors concentrations are more preserved. Values were determined as follows; MIP-1α (t=3.17, df=62, p<0.002), IP-10 (t=3.309, df=62, p<0.004), IL-8 (t=3.92 df=62, p<0.001), and MCP-1 (t=4.07, df=62, p<0.001) When comparing donor milk to mother's own milk, a fair comparison would be to test week 6 mothers' own milk, which is mature milk by this stage of lactation against the donor milk, the maturity of which is unknown, but is certainly mature milk. The comparison is presented in Table 5.

TABLE 5

CCGF in mothers' own milk at 6 weeks postpartum compared to donor milk.

| CCGF | Mother's own milk (n = 18) | | Donor milk (n = 11) | | | |
|---|---|---|---|---|---|---|
| (pg/ml) | M | SD | M | SD | t | P |
| IL-10 | 5.5 | 11.4 | 1.5 | 2.5 | 1.5 | 0.15 |
| IL-4 | 5.4 | 13.6 | 2.2 | 4.5 | 0.92 | 0.37 |
| IL-6 | 10.5 | 29.8 | 9.4 | 12.9 | 0.14 | 0.89 |
| TNF-α | 9.5 | 9.7 | 1.7 | 2.1 | 3.3 | 0.002 |
| IL-8 | 76.6 | 217.4 | 24.5 | 16.9 | 1.03 | 0.31 |
| IL-10 | 1110.9 | 1475.2 | 764.2 | 668.5 | 2.1 | 0.04 |
| MCP-1 | 630.7 | 828.2 | 1164.03 | 1582.3 | 4.2 | 0.000 |
| MIP-1α | 3.42 | 12.3 | 7.2 | 15.3 | 2.03 | 0.049 |
| EOF | 10142.0 | 5818.1 | 10418.9 | 7167.2 | −0.114 | 0.91 |

The data show that preterm milk cytokines decline over time, as expected, although the chemokines such as IL-8, MCP1, IP-10, and MIP-1α appear highly conserved. There is a great deal of variation over time between individual woman's milk samples. Further, there is in general a surprising retention of CCGF in donor milk subjected to Holder pasteurization. The banked donor milk possessed CCGF concentrations that are relatively equivalent to mature milk (MOM) produced after 6 weeks of lactation by mothers of preterm infants. However, preterm infants fed with banked donor milk, instead of MOM, during the first weeks of life accordingly are receiving less of the critical CCFGs.

Holder pasteurization is the method of choice for sterilizing human milk, and the measured CCGF appears to possess some heat-resistant properties, refuting the belief that Holder pasteurization eliminates immune components. The only cytokines that are significantly different in donor milk are TNF-α and IL-10 at 6 weeks postpartum. Most of the significant chemokines are lower in donor milk, but still present in high concentrations. While they are not denatured, it is not clear if they remain functional. This information agrees with a recent publication which used multiplexing of similar CCGFs (Espinosa-Martos, et al., Bacteriological, biochemical, and immunological modification in human colostrum after Holder pasteurization. J Pediatr Gastroenterol Nutr. 2013 May; 56(5):560-8), which showed measurable CCGF in both Holder pasteurized colostrum and mature milk. Differences may be due to effects of the matrix used, as analytes in many human milk samples have been found to exhibit significant matrix effects on measurement values when using the manufacturer's (Millipore) kits and matrix solutions. In the present analysis, the matrix was serum matrix from Millipore added to controls, standards, and samples, which was previously reported to provide a successful milk matrix for multiplexing (Groer, et al., Multiplexing of human preterm and term milk cytokines. FASEB J. April 2013; 27(Meeting Abstract Supplement):629.7).

Banked donor milk is increasingly being used to feed preterm infants in lieu of formula because there is good evidence that it has protective properties similar to those of MOM (Heiman & Schanler, Benefits of maternal and donor human milk for premature infants. Early Hum Dev. 2006; 82(12): 781-787). There are, however, unknown characteristics of banked donor milk (maternal factors, heat resistant viruses, developmental stages of lactation, processing, pooling, freezing) that might influence its bioefficacy and safety (Menon & Williams, Human milk for preterm infants: why, what, when and how? Arch Dis Child Fetal Neonatal Ed. 2013; 98(6): F559-F562). Neonatal intensive care units make decisions about when to institute and discontinue banked donor milk, based at least in part on the cost/benefit ratio of banked donor milk (Arnold, The cost-effectiveness of using banked donor milk in the neonatal intensive care unit: prevention of necrotizing enterocolitis. J Hum Lact. 2002; 18(2):172-177; Jegier, et al., The institutional cost of acquiring 100 mL of human milk for very low birth weight infants in the neonatal intensive care unit. J Hum Lact. 2013; 29(3):390-399). For example, in the study NICU, banked donor milk is stopped and formula instituted around 34 weeks gestational age, a point at which the risk for necrotizing enterocolitis and infection are greatly reduced (Sharma R, Hudak ML. A clinical perspective of necrotizing enterocolitis: past, present, and future. Clin Perinatol. 2013; 40(1):27-51).

Data suggest that banked donor milk may not be developmentally appropriate in terms of CCGF during the early weeks of life in low birth weight infants, but it is superior to formula, which contains no CCGFs. Although not confirmed, it is plausible that critical periods in preterm infant development are aligned with milk biology (Menon & Williams, Human milk for preterm infants: why, what, when and how? Arch Dis Child Fetal Neonatal Ed. 2013; 98(6):F559-F562). Cytokines in milk decline over time of lactation, which may be timed to coincide with maturation of the neonatal gut and immune system (Ustundag, et al. Levels of cytokines (IL-1β, IL-2, IL-6, IL-8, TNF-α) and trace elements (Zn, Cu) in breast milk from mothers of preterm and term infants. Mediators Inflamm. 2005; 2005(6):331-336; Kverka et al. Cytokine profiling in human colostrum and milk by protein array. Clin Chem. 2007; 53(5):955-962; Hawkes, et al. Cytokines (IL-1beta, IL-6, TNF-alpha, TGF-beta1, and TGF-beta2) and prostaglandin E2 in human milk during the first three months postpartum. Pediatr Res. 1999; 46(2):194-199; Castellote, et al., Premature delivery influences the immunological composition of colostrum and transitional and mature human milk. J Nutr. 2011; 141(6):1181-1187).

A prospective study of milk from mothers reported that protein levels were higher in preterm milk over 8 weeks of lactation (Bauer J, Gerss J. Longitudinal analysis of macronutrients and minerals in human milk produced by mothers of preterm infants. Clin Nutr. 2011; 30(2):215-220). In a recent Korean study, the composition of milk to 3 months postpartum was compared between mothers who delivered preterm and a cohort of term mothers, and some differences in milk fatty acid composition were described (Jang, et al., Serial changes of fatty acids in preterm breast milk of Korean women. J Hum Lact. 2011; 27(3):279-285). In another study, beta-endorphin levels at 30 days postpartum did not differ between preterm and term milk (Zanardo, et al., Beta endorphin concentrations in human milk. J Pediatr Gastroenterol Nutr. 2001; 33(2): 160-164).

Neonatal intensive care units are using banked donor milk with greater frequency (Delfosse, et al., Donor human milk largely replaces formula-feeding of preterm infants in two urban hospitals. J Perinatol. 2013; 33(6):446-451). Preterm infants fed exclusively or predominantly with banked donor milk during the first weeks of life will receive lower levels of these immune components than if fed MOM. As such, supplementing the banked milk with immune components and/or other lactation proteins assists in the care of preterm infants and newborns.

Example 2

Banked donor milk is obtained from a milk bank, generally from banks that specify the donor mothers are healthy, test negative for HIV, human t-cell lymphotrophic virus, hepatitis B and C, and syphilis, who do not smoke, who drink no more than 2 alcoholic drinks per day, do not use illegal drugs, and breast-feed an infant of 1 year of age or less. An aliquot of 0.5 ml of milk is removed using a syringe, centrifuged at 1000 g at 4° C. for 10 minutes, defatted by spooning the fat layer using a Corning spoon No. 3004 (ThermoFisher Scientific, Waltham, Mass.). The whey fraction was filtered through a 0.45 µm Millipore low protein binding PVDF filter (No. SLHVM23N S; ThermoFisher Scientific, Waltham, Mass.) and the processed fraction tested to determine the levels of CCGF, as discussed in Example 1. Alternatively, enzyme-linked immunosorbent assay (ELISA) can be used to determine CCGF levels.

Levels of the CCGF in the bank milk are compared to levels of CCGF in preterm milk-early MOM, identified in Example 1. Protein factors or recombinant protein factors, such as IL-4, IL-10, IL-6, IL-8, IP-10, TNF-α, IL-8, MCP-1, and MIP-1α (Life Technologies, ThermoFisher Scientific, Inc. Carlsbad, Calif.) are added to the banked milk as needed, based on the analysis of the banked milk compared to preterm milk-early MOM. For example, for preterm infants, a comparison of preterm milk to banked milk may indicate a difference in TNF-α of 3.7 pg/ml, necessitating the addition of 3.7 pg/ml TNF-α to the bank milk. CCGF levels may be compared based on mean CCGF for the specific cytokine, chemokine or growth factor, the lower limit for the specific cytokine, chemokine or growth factor, or the upper limit for the specific cytokine, chemokine or growth factor. After analysis of the protein factors, and addition of protein factors as required to remediate low or deficient levels of one or more protein factors, the banked milk should approximate the immunological and growth factor properties of preterm milk Example 3

Banked donor milk can also be tested for lactation proteins. Banked donor milk is obtained from a milk bank, generally from banks that specify the donor mothers test negative for HIV, human t-cell lymphotrophic virus, hepatitis B and C, and syphilis, who do not smoke, who drink no more than 2 alcoholic drinks per day, do not use illegal drugs, and breast-feed an infant of 1 year of age or less. The milk is typically shipped frozen in aliquots and thawed and measured and either mixed with mother's own milk if it is available or given as the full feeding, the amount determined by the caloric needs of the infant each day. An aliquot of 0.5 ml of milk is removed using a syringe, centrifuged at 1000 g at 4° C. for 10 minutes, defatted by spooning the fat layer using a Corning spoon No. 3004 (ThermoFisher Scientific, Waltham, Mass.). The whey fraction was filtered through a 0.45 µm Millipore low protein binding PVDF filter (No. SLHVM23N S; ThermoFisher Scientific, Waltham, Mass.) and the whey fraction tested to determine the levels of proteins. Alternatively, ELISA can be used to test for protein levels. Advantageously, this can be performed concurrently with CCGF testing, in addition to CCGF testing, or independently from CCGF testing or embodiments using CCGF. Banked donor milk can then be supplemented at the same time, or at different times, from CCGF supplementation.

Lactation protein assays can be conducted using available kits, such as human lysozyme enzyme immunoassay (Biomedical Technol., Inc., Ward Hill Mass.), sandwich assays (Czank, et al., et al., Retention of the immunological proteins of pasteurized human milk in relation to pasteurizer design and practice. Pediatr Res. 2009 October; 66(4):374-9; Prentice, et al., The nutritional role of breast milk IgA and lactoferrin. Acta Paediatr Scand. 1987 July; 76(4):592-8), or ELISA assay. After analysis of the lactation proteins, and addition of one or more lactation proteins as required to remediate low or deficient levels of one or more proteins, the banked milk should approximate the lactation protein properties of preterm milk.

Example 4

Formula can be supplemented using cytokines, chemokines, growth factors, and by supplementing lactation proteins, as noted in the above examples. Formula can be analyzed similarly to breast milk when in a suspended state, i.e. any lyophilized or "dry" formula suspended in a liquid carrier. As noted above, formula lacks immunological proteins. As such, the protein factors can be added to reach levels found in preterm milk, as noted in the earlier examples. Lactation protein levels can be determined as provided in example 3, and one or more lactation proteins added as required to remediate low or deficient levels of one or more proteins, the banked milk should approximate the lactation protein properties of preterm milk.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a method of supplementing breast milk, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:
1. A method of supplementing breast milk, comprising:
obtaining pasteurized breast milk;
determining a level of at least one protein factor in the pasteurized breast milk, wherein the at least one protein factor is a cytokine, chemokine, or growth factor selected from the group consisting of IL-4, MCP-1, MIP-1α, and a combination thereof;
comparing the level of the at least one protein factor in the pasteurized breast milk to levels of the at least one protein factor in preterm milk;
identifying low levels or deficient levels in the at least one protein factor; and adding at least one additive to the breast milk, wherein the additive is a cytokine, chemokine, or growth factor to remediate low levels or deficient levels in the at least one protein factor.

2. The method of claim 1, further comprising:
determining the level of at least one supplemental protein factor, wherein the at least one supplemental protein factor is one or more cytokine, chemokine, or growth factors selected from the group consisting of IL-10, IL-6, IP-10, TNF-α, IL-8, and a combination thereof; and
adding the at least one supplemental protein factor to remediate low levels or deficient levels in the at least one supplemental protein factor.

3. The method of claim 2, wherein the at least one protein factor is IL-4 and the at least one supplemental protein factor is selected from the group consisting of IL-10, IL-8, IP-10, TNF-α, and a combination thereof.

4. The method of claim 3, wherein the at least one additive is added to bring low levels or deficient levels of the protein factor within the range 9 pg/ml to 18 pg/ml for IL-4, 75 pg/ml to 10400 pg/ml for MCP-1, or 10 pg/ml to 493 pg/ml for MIP1α;
and wherein a supplemental protein factor is added to bring low levels or deficient levels of the supplemental protein factor within the range:
8 pg/ml to 98 pg/ml for IL-10;
17 pg/ml to 117 pg/ml for IL-6;
18 pg/ml to 254 pg/ml for TNF-α; or
a combination thereof.

5. The method of claim 4, wherein the at least one additive is added to bring low levels or deficient levels of the protein factor to 13 pg/ml for IL-4; and
wherein a supplemental protein factor is added to bring low levels or deficient levels of the supplemental protein factor to a preterm value selected from the group consisting of 11 pg/ml for IL-10, 11.8 pg/ml for IL-10, 12 pg/ml for IL-10, 17.69 pg/ml for IL-6, 26.9 pg/ml for IL-6, 28 pg/ml for IL-6, 21.17 pg/ml for TNF-α, 23.2 pg/ml for TNF-α, 24 pg/ml for TNF-α, and a combination thereof.

6. The method of claim 1, wherein the at least one additive is added to bring low levels or deficient levels of the at least one protein factor within the range:
9 pg/ml to 151 pg/ml for IL-4, 75 pg/ml to 10400 pg/ml for MCP-1, or 10 pg/ml to 493 pg/ml for MIP1α.

7. The method of claim 6, wherein the at least one additive is added to bring low levels or deficient levels of the at least one protein factor to a preterm value of 13 pg/ml for IL-4, 13.54 pg/ml for IL-4, or 15.7 pg/ml for IL-4.

8. The method of claim 1, wherein the pasteurized breast milk was treated at 62.5° C. for 30 minutes, 63° C. for 30 minutes, 62° C. for 5 seconds, 65° C. for 5 seconds, or 72° C. for 5 seconds.

9. The method of claim 8, wherein the pasteurized breast milk is preterm milk.

10. The method of claim 1, wherein the pasteurized breast milk is preterm milk.

11. The method of claim 1, wherein the pasteurized breast milk is human breast milk.

12. The method of claim 1, further comprising adding at least one lactation protein, wherein the lactation protein is selected from the group consisting of lysozyme, lactoferrin, and a combination thereof;
wherein the level of lysozyme is between about 63 g/L and about 173 g/L; and
wherein the level of lactoferrin is between about 0.78 g/L and about 1.33 g/L.

13. The method of claim 2, further comprising adding EGF to remediate low levels or deficient levels in EGF.

14. A method of supplementing formula, comprising:
obtaining formula for pre-term infants;
determining the level of at least one protein factor in the formula for pre-term infants;
comparing the level of the at least one protein factor in the formula for pre-term infants to the level of the at least one protein factor in preterm milk; and
adding at least one additive to the formula for pre-term infants, wherein the additive is the at least one protein factor selected from the group consisting of IL-4, MCP-1, MIP-1α, and a combination thereof.

15. The method of claim 14, further comprising:
determining the level of at least one supplemental protein factor, wherein the at least one supplemental protein factor is one or more cytokine, chemokine, or growth factors selected from the group consisting of IL-10, IL-6, TNF-α, IL-8, and a combination thereof; and
adding the at least one supplemental protein factor to remediate low levels or deficient levels in the at least one supplemental protein factor.

16. The method of claim 15, wherein the at least one protein factor is IL-4 and the at least one supplemental protein factor is selected from the group consisting of IL-10, IL-8, IP-10, TNF-α, and a combination thereof.

17. The method of claim 16, wherein the at least one additive is added to bring low levels or deficient levels of the protein factor within the range 9 pg/ml to 18 pg/ml for IL-4, 75 pg/ml to 10400 pg/ml for MCP-1, or 10 pg/ml to 493 pg/ml for MIP1α;
and wherein a supplemental protein factor is added to bring low levels or deficient levels of the supplemental protein factor within the range:
8 pg/ml to 15 pg/ml for IL-10;
17 pg/ml to 31 pg/ml for IL-6;
20 pg/ml to 28 pg/ml for TNF-α; or
a combination thereof.

18. The method of claim 17, wherein the at least one additive is added to bring low levels or deficient levels of the protein factor to 13 pg/ml for IL-4 and a supplemental protein factor value selected from the group consisting of 12 pg/ml for IL-10, 28 pg/ml for IL-6, 24 pg/ml for TNF-α, and a combination thereof.

19. The method of claim 15, further comprising adding EGF to remediate low levels or deficient levels in EGF.

20. The method of claim 14, further comprising adding at least one lactation protein, wherein the lactation protein is selected from the group consisting of lysozyme, lactoferrin, and a combination thereof;
wherein the level of lysozyme is between about 63 g/L and about 173 g/L;
wherein the level of lactoferrin is between about 0.78 g/L and about 1.33 g/L.

* * * * *